May 23, 1939.  J. C. McCUNE  2,159,814
MAGNETIC TRACTION BOOSTER
Filed July 16, 1936
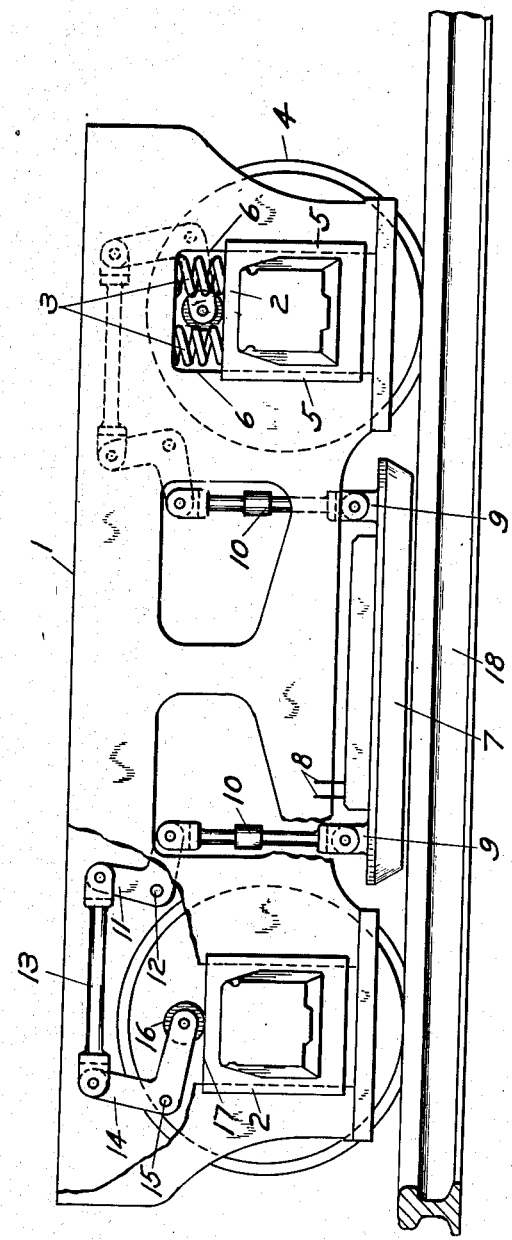
INVENTOR.
JOSEPH C. McCUNE
BY
ATTORNEY.

Patented May 23, 1939

2,159,814

UNITED STATES PATENT OFFICE 2,159,814

MAGNETIC TRACTION BOOSTER

Joseph C. McCune, Edgewood, Pa., assignor to The Westinghouse Air Brake Company, Wilmerding, Pa., a corporation of Pennsylvania Application July 16, 1936, Serial No. 90,856

8 Claims. (Cl. 105—77)

This invention relates to magnetic traction boosters, and more particularly to boosters for increasing the traction of the wheels of a railway vehicle, so that a greater braking force can be applied to the wheels without causing the wheels to slide.

In order to bring railway vehicles to a stop promptly from exceptionally high speeds high braking forces must be employed. If the adhesion between the vehicle wheels and the track rails is not sufficient to permit the desired rate of deceleration there is considerable danger of the high braking forces producing sliding of the vehicle wheels. In order to increase the adhesion between the wheels and rails there have heretofore been proposed various forms of magnetic traction boosters.

The magnetic traction boosters are essentially electromagnets suspended from the truck of a vehicle directly over the track rails, and when energized produce a strong magnetic attraction sufficient to draw the vehicle wheels to the rails with a substantial force. Such boosters are most effective when they can be maintained at a fixed minimum distance above the rail. This is, however, difficult to do when the boosters are suspended from the truck frame and the truck frame is mounted on the axle housings through intervening springs.

If the magnetic boosters are adjusted for a desired height above the track rails when the vehicle is lightly loaded, then the springs intervening between the truck frame and the axle housings will deflect appreciably when the vehicle is loaded, thus causing the boosters to drop so low as to drag on the track rails. This is of course undesirable while the vehicle is moving under power.

A principal object of the present invention is to provide a magnetic traction booster with suspension means for maintaining the booster a fixed height above a track rail regardless of relative movement between the truck frame and the axle housings due to variations in load in the car.

A further object of the invention is to produce a magnetic traction booster which will produce a substantially constant traction effect for all load conditions of the vehicle.

Further objects and advantages of the invention will be apparent from the following description, which is taken in connection with the single figure of the attached drawing, which shows in diagrammatic form a preferred embodiment of the invention.

Referring now to the drawing, a single vehicle truck is diagrammatically indicated by the truck side frame member 1 which is supported at each end on axle housings 2 by means of intervening springs 3. The axle housings 2 support the axles upon which vehicle wheels 4 are mounted. The axle housings are recessed at 5 to receive the coacting edges 6 of the truck side frame 1, so that the truck side frame may move relative to the axle housings and yet maintain a fixed wheel base between the two axles of the truck.

The magnetic traction booster is indicated at 7 and is essentially an electromagnet, such for example as the well-known magnetic track brake shoe. The winding within the booster is energized with electric current which may be supplied thereto through conductors 8.

At each end of the booster is a lug 9 which has pivotally secured thereto one end of a turn buckle 10, the other end of which is pivotally secured to one arm of a bell crank lever 11 having its fulcrum point about a pin 12 secured to the truck frame member 1. The other arm of the bell crank 11 is connected by a rod 13 to one arm of a second bell crank lever 14. This second bell crank is also pivotally mounted on a pin 15, which pin is secured to the truck frame member 1. The other arm of the bell crank 14 carries at its extreme end a roller 16. This roller engages the top surface 17 of the adjacent axle housing 2.

The two bell crank levers 11 and 14 are preferably duplicates, and the effective moment radii of the two arms of each are equal, so that the force applied perpendicularly through the moment radius of one arm is counterbalanced by an equal force oppositely applied perpendicularly through the moment radius of the other arm.

When the parts are assembled as illustrated, the magnetic booster 7 is adjusted for a chosen height above a track rail 18 by means of the turn buckles 10. When this adjustment has been made current may be supplied to the booster through the conductors 8, whereupon the booster will produce a magnetic force of attraction between itself and the track rail 18, thus exerting a downward pull on the two turn buckles 10. This downward pull will tend to rotate each of the bell crank levers 11 in a direction such that the rod 13 connected thereto will pull on the bell crank lever 14 to rotate the connected arm of each inwardly.

The other arm of each bell crank lever 14 will then press down, through its roller 16, on the top surface 17 of the associated axle housing. The force with which the roller 16 bears upon the axle housing reacts upwardly on the truck frame member and is substantially equal to that exerted downwardly on each turn buckle 10, so that there is no deflection of the truck springs 3 due to the magnetic pull exerted by the booster. The booster therefore remains a fixed distance above the rail. The connections between the bell cranks 11 and the turn buckles 10, between the bell cranks 11 and the rods 13, and between the bell cranks 14 and the rods 13 are made with a close fit so that there is no appreciable slack in the linkage to be taken up when the booster is energized.

If the height of the booster above the track rail is determined when the car is lightly loaded, then when the car is loaded the truck frame 1 will move relative to the axle housings 2. As this movement takes place the roller 16 associated with each bell crank lever 14 will be moved upwardly, and each bell crank 14 will exert a pull on its rod 13. This will in turn cause each bell crank lever 11 to be rotated to lift the booster by the same amount that the truck frame is deflected downwardly, because the arms of each of the bell crank levers 11 and 14 are of equal length. Therefore even with varying load conditions the booster will remain a fixed distance above the track rail.

It follows therefore, that regardless of the height for which the booster is initially adjusted by manipulation of the turn buckles 10, this distance will be maintained under all load conditions and for any degree of energization of the booster magnetizing winding.

While I have illustrated and described my invention in connection with one specific embodiment, it is not my intention to be limited to this particular embodiment or otherwise than by the spirit and scope of the appended claims.

Having now described my invention, what I claim as new and desire to secure by Letters Patent, is:

1. In combination, a truck side frame member, an axle housing, springs for supporting said side frame member on said housing and for permitting said frame member to move relative to said housing, a magnetic traction booster, and a lever mechanism pivotally carried by said truck side frame member and being adapted to transmit to said axle housing the force of magnetic attraction exerted by said booster for a track rail.

2. In combination, a truck side frame member, an axle housing, a bell crank lever pivotally mounted to said truck side frame member and having one arm thereof bearing on said axle housing, a magnetic traction booster adapted when energized to produce a force of attraction for a track rail, and means for causing said bell crank lever to bear upon said axle housing with a force proportional to the force of attraction of said booster for said track rail.

3. In combination, a truck side frame member, an axle housing, a magnetic traction booster device suspended from said truck side frame member and adapted when energized to produce a downward pull on said truck side frame member, and means on said truck side frame member and reacting on said axle housing for applying an upward force on said truck side frame member proportional to the downward force exerted by said booster device.

4. In combination, a truck side frame member, an axle housing, springs interposed between said truck side frame member and said axle housing and permitting relative movement between said frame member and said housing, a first bell crank lever pivotally secured to said truck frame member, one of the two arms of said bell crank lever bearing upon said axle housing, a second bell crank lever also pivotally secured to said truck side frame member, said second bell crank lever having one of the two arms thereof connected to the other arm of said first bell crank lever, an electromagnet adapted when energized to produce a force of attraction for a track rail, and means for suspending said electromagnet from the other arm of said second bell crank lever, said two bell crank levers being so disposed as to maintain the position of said magnet above the track rail unchanged by a change in the relative position of said truck side frame member with respect to said axle housing.

5. In combination, a truck side frame member, a plurality of axle housings, springs interposed between said truck side frame member and said axle housings, said springs being deflected when the load on said truck side frame member is increased, a magnetic traction booster device for producing a magnetic force of attraction for a track rail, means for producing a downward force on said truck side frame member proportional to the magnetic force of attraction between said booster device and said track rail, and means for producing a counterbalancing upward force on said truck side frame member in response to said first mentioned force, whereby the springs between said truck side frame member and said axle housings remain undeflected due to action of the magnetic traction booster device.

6. In combination, a vehicle truck having a sprung part and an unsprung part so arranged that the sprung part moves vertically with respect to the unsprung part, an electromagnet device for producing a magnetic attraction for a track rail, means for suspending said electromagnet device from said sprung part of the truck directly over and above a track rail, and means relating said suspension means to the unsprung part of the truck in a manner such that the electromagnet device is maintained a substantially fixed distance above the track rail regardless of the movement of the sprung part of the truck with respect to the unsprung part.

7. In combination, a vehicle truck having a sprung part and an unsprung part so arranged that the sprung part moves relative to the unsprung part in accordance with variations in load on the truck, an electromagnet device, elements for suspending said electromagnet device from the sprung part of said truck directly over and above a track rail, and other elements connected to said suspension elements and engaging with the unsprung part of the truck for maintaining the said electromagnetic device a substantially fixed distance above a rail regardless of relative movement between said sprung and unsprung parts.

8. In combination, a vehicle truck having a sprung part and an unsprung part movable relative to each other, a plurality of bell crank levers pivotally connected to the said sprung part of the truck, and an electromagnet device connected to certain of said bell crank levers and suspended therefrom over and above a track rail, the other of said bell crank levers engaging with the unsprung part of said truck and being so arranged with respect to the first mentioned bell crank levers as to hold said electromagnet device a substantially constant distance above the track rail regardless of relative movement between said sprung and unsprung truck parts.

JOSEPH C. McCUNE.